US012563050B2

(12) United States Patent
Medvedovsky et al.

(10) Patent No.: US 12,563,050 B2
(45) Date of Patent: Feb. 24, 2026

(54) TECHNIQUES FOR DETECTING CYBER-ATTACK SCANNERS

(71) Applicant: Radware, Ltd., Tel Aviv (IL)

(72) Inventors: Lev Medvedovsky, Netanya (IL); David Aviv, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 220 days.

(21) Appl. No.: 17/646,234

(22) Filed: Dec. 28, 2021

(65) Prior Publication Data

US 2023/0208857 A1 Jun. 29, 2023

(51) Int. Cl.
*H04L 9/40* (2022.01)

(52) U.S. Cl.
CPC ...... *H04L 63/1416* (2013.01); *H04L 63/0236* (2013.01); *H04L 63/1458* (2013.01)

(58) Field of Classification Search
CPC ............. H04L 63/1416; H04L 63/0236; H04L 63/1458
See application file for complete search history.

(56) References Cited

U.S. PATENT DOCUMENTS

| | | | | |
|---|---|---|---|---|
| 7,624,447 | B1 * | 11/2009 | Horowitz | H04L 63/0263 |
| | | | | 726/23 |
| 9,654,483 | B1 * | 5/2017 | Benson | H04L 63/1466 |
| 11,290,476 | B1 * | 3/2022 | Ochsner | H04L 43/106 |
| 11,363,057 | B1 * | 6/2022 | Talbot | H04L 41/22 |
| 11,374,968 | B1 * | 6/2022 | Colón | H04L 63/1466 |
| 11,595,408 | B2 * | 2/2023 | Beddus | G06F 9/5061 |

| | | | | |
|---|---|---|---|---|
| 2006/0098585 | A1 * | 5/2006 | Singh | H04L 69/22 |
| | | | | 370/252 |
| 2007/0019640 | A1 * | 1/2007 | Thiede | H04L 43/065 |
| | | | | 370/389 |
| 2008/0028467 | A1 * | 1/2008 | Kommareddy | H04L 63/1458 |
| | | | | 726/23 |
| 2011/0069632 | A1 * | 3/2011 | Chen | H04L 43/026 |
| | | | | 370/253 |
| 2014/0181473 | A1 * | 6/2014 | Dice | G06F 9/52 |
| | | | | 712/203 |
| 2014/0373149 | A1 * | 12/2014 | Rihn | H04L 63/145 |
| | | | | 726/23 |

(Continued)

OTHER PUBLICATIONS

Mirkovic, et al. "A Taxonomy of DDoS Attack and DDoS Defense Mechanisms" vol. 34, No. 2: Apr. 2004.

*Primary Examiner* — Kambiz Zand
*Assistant Examiner* — Afaq Ali
(74) *Attorney, Agent, or Firm* — M&B IP Analysts, LLC

(57) ABSTRACT

A method and system for detecting and mitigation a cyber-attack scanner are provided. The method includes determining if a source network address designated in a received packet is suspicious as of a cyber-attack scanner, wherein the determination is based on a likelihood that the source address was previously frequently encountered; upon determining that the source network address is suspicious, determining diversity of destination network addresses sent by a source having the suspicious network address; and upon determining that the destination network addresses are diversified, generating an alarm indicating that a source network address is a cyber-attack scanner, wherein a cyber-attack scanner is a device to identify destination network addresses in a protected entity that be exploit for at least a cyber-attack scanner.

23 Claims, 9 Drawing Sheets

(56) References Cited

U.S. PATENT DOCUMENTS

| 2017/0295196 | A1* | 10/2017 | Arnell | H04L 61/4511 |
|---|---|---|---|---|
| 2017/0353491 | A1* | 12/2017 | Gukal | H04L 45/02 |
| 2017/0366576 | A1* | 12/2017 | Donahue | H04L 63/1416 |
| 2018/0349280 | A1* | 12/2018 | Prasad | G06F 12/128 |
| 2021/0273865 | A1* | 9/2021 | Jing | H04L 63/1425 |
| 2021/0273960 | A1* | 9/2021 | Humphrey | H04L 63/1425 |
| 2022/0124106 | A1* | 4/2022 | Chiu | H04L 63/1425 |

* cited by examiner

200

Protected
Entity
130

Scanner
Detector
150 security
system
160

Network
140

Scanner
120

Client
110

Attack
Tool
125

TECHNIQUES FOR DETECTING CYBER-ATTACK SCANNERS

TECHNICAL FIELD

This present disclosure generally relates to techniques for protecting network and computing resources against distributed denial of service (DDoS) attacks to techniques for early detection of cyber-attack scanners.

BACKGROUND

These days, online businesses and organizations are vulnerable to malicious attacks. Recently, cyber-attacks have been committed using a wide arsenal of attack techniques and tools targeting both the information maintained by the online businesses and their IT infrastructure. Hackers and attackers are constantly trying to improve their attack strategies to cause irrecoverable damage, overcome current deployed protection mechanisms, and so on.

A DoS/DDoS attack is an attempt to make a computer or network resource unavailable or idle. A common technique for executing DoS/DDoS attacks includes saturating a target victim resource (e.g., a computer, a WEB server, an API server, a WEB application, and the like), with external requests. As a result, the target victim becomes overloaded, and it cannot respond properly to legitimate traffic.

To execute a DDoS attack, an attacker would first try to identify network addresses, such as IP addresses at a target server and send high volume of traffic to the detected network addresses. The traffic may be generated and sent from multiple resources in bursts, but regardless of the nature of the attack traffic, the destination (target) network addresses remain the same.

The identification of such addresses is performed by compromised computers (executing a malware) or dedicated computers (hereinafter "cyber-attack scanners" or "cyber-attack scanner"). A cyber-attack scanner can probe random addresses in either global or local IP address space. A cyber-attack scanner can also perform a hitlist scan according to an externally supplied list. When such scanners detect a vulnerable computer, the scanner sends a portion of the hitlist to an attack tool generating the DDoS traffic. A cyber-attack scanner can also perform a signpost scan by taking advantage of habitual communication patterns of the compromised host to select new targets. For example, a web-based scanner (malware) can be propagated by infecting every vulnerable client that clicks on a server's web page. The behavior of compromised computers acting as cyber-attack scanners can be remotely controlled; that is, the frequency of scanning and the type of scanning can be remotely programmed or changed.

The operation of the cyber-attack scanner is characterized by sending relatively low volume of traffic in short bursts. Thus, detection of such scanners by conventional DDoS detection tools is not feasible as those tools are typically designed to detect abnormal activity in high volume of traffic. However, the lack of early detection of cyber-attack scanners can lead to a greater impact of a DDoS attack when executed.

It would be, therefore, advantageous to provide an efficient security solution for early detection of cyber-attack scanners.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for detecting a cyber-attack scanner. The system comprises determining if a source network address designated in a received packet is suspicious as of a cyber-attack scanner, wherein the determination is based on a likelihood that the source address was previously frequently encountered; upon determining that the source network address is suspicious, determining diversity of destination network addresses sent by a source having the network address; and upon determining that the destination network addresses are diversified, generating an alarm indicating that a source network address is a cyber-attack scanner, wherein a cyber-attack scanner is a device used to identify destination network addresses in a protected entity that can be exploited for at least a cyber-attack scanner.

Some embodiments disclosed herein include a system for detecting a cyber-attack scanner. The system comprises a processing circuitry; and a memory, with the memory containing instructions that, when executed by the processing circuitry, configure the system to: determine if a source network address designated in a received packet is suspicious of being a cyber-attack scanner, wherein the determination is based on a likelihood that the source address was previously frequently encountered; upon determining that the source network address is suspicious, determine the diversity of destination network addresses sent by a source having the network address; and upon determination that the destination network addresses are diversified, generate an alarm indicating that a source network address is a cyber-attack scanner, wherein a cyber-attack scanner is a device to identify destination network addresses in a protected entity that can be exploited for at least a cyber-attack scanner.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
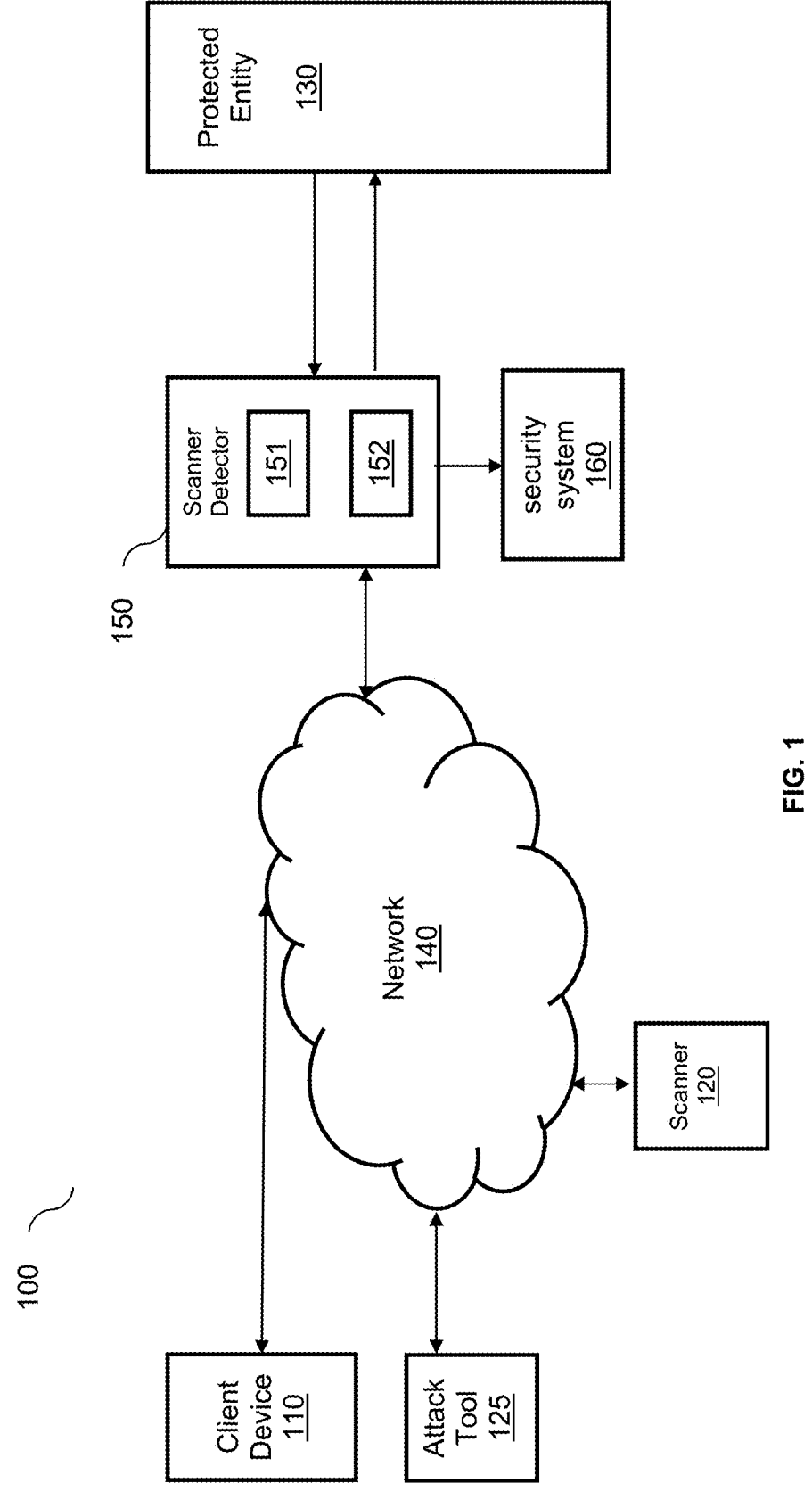
FIG. 1 is a schematic network diagram illustrating a scanner detector system utilized to describe the various embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for detecting cyber-attack scanners, thereby allowing for early mitigation or prevention of cyber-attacks, including DDoS attacks, data theft, ransom demand, fraud and scamming, destruction, and other and other unauthorized attempts to penetrate a protected entity. According to the disclosed embodiments, detection of cyber-attack scanners are performed in two stages: an identification of suspicious source IP addresses; and then determination of diversity of destination IP addresses and/or ports of each suspicious source IP address. A suspicious source IP address is a source network (IP) address of a potential cyber-attack scanner. Destination IP addresses and/or ports are of targeted or victim resources. The detection of cyber-attack scanner is confirmed when traffic from the same suspicious source IP address is sent to a relatively large set of destination IP addresses and/or ports. A cyber-attack scanner may be realized as a device, an object, which may be virtual, physical, or both.

In an embodiment, a detection of a suspicious source IP address is performed using a Modified Bloom Filter (MBF) with floating-point counters based on a share of traffic sent from a certain IP address. Specifically, source IP addresses that abruptly begin to send traffic too frequently relative to others are filtered and considered as suspicious. The destination diversity of suspected source IP addresses is determined using, for example, a circular buffer that temporarily collects necessary data of all incoming samples. The samples belonging to a suspected source IP address are fetched from the buffer and their destination diversity is compared to a predefined or learned threshold.

In an embodiment, to optimize the detection of suspicious source IP addresses, source IP addresses included in the auto-updating whitelist bypass this check. Such IP addresses include known crawlers, content delivery networks (CDN), and all IP addresses determined, according to the disclosed embodiments, as not suspicious.

The disclosed embodiments allow for detection of cyber-attack scanners before an actual DDoS attack is being detected. Therefore, any detected cyber-attack scanner can be blocked by, for example, blocking its source IP. Further, any blocked IP can be added to a blacklist. This would limit the scope of a DDoS attack if such attack is already on-going. That is, the number of destination IP addresses that can be targeted as attacks can be minimized. As such, the disclosed embodiment improves the security of protected entities and can further reduce computing resources consumed by DDoS attack detection tools.

FIG. 1 is a schematic for network diagram 100 and is utilized to describe the various embodiments. The network diagram 100 shows client device 110 communicate with a protected entity 130 over a network 140. In order to demonstrate the disclosed embodiments, the client device 110 is a legitimate client (operated by a real user) and the protected entity 130 is a resource that a cyber-attack scanner 120 attempts to scan. That is, the cyber-attack scanner 120 attempts to detect IP addresses and/or ports that are open so that malicious traffic can be directed to such IP addresses by an attack tool 125.

The attack tool 125 carries out the malicious attacks against the protected entity 130. The attack tool 125 can be a dedicated tool for performing DoS/DDoS attacks ("collectively referred to "DoS attacks") such as those described above. The attack tool 125 can also execute attacks using high volume traffic. The attack can be carried over a transport-layer protocol (e.g., TCP, UDP, etc.) or an application-layer protocol (e.g., HTTP, HTTPs, etc.). An attack tool can be any infected client device. The attack tool 125 can execute DDoS or DoS attacks based on information (network addresses) discovered by the scanner. The DDoS attacks may include distributed attacks, slow attacks, flood attacks, and so on.

It should be noted that the embodiments disclosed herein are applied when multiple attack tools execute the attacks against the protected entity 130 concurrently. Similarly, vast numbers of legitimate client devices can operate concurrently. The client device 110, the cyber-attack scanner 120, and the attack tool 125 can reach the protected entity 130 concurrently. It should be noted that the embodiments are not limited to detection of any certain type of scanners, but can be utilized to detection of any types of network scanners attempting to exploit protected entity.

The protected entity 130 is the entity to be protected from malicious threats. The protected entity 130 may be a physical or virtual entity (e.g., a virtual machine, a software container, a serverless function, and the like). The protected entity 130 may be an IoT device, a smartphone, a wearable device, a computer, a network node, a server, a storage device, or any device with an access to the network 140.

In some configurations, the protected entity 130 may be deployed in a datacenter or a cloud computing platform (not shown), on the premises of an organization, and the like. The cloud computing platform may be a private cloud, a public cloud, a hybrid cloud, or any combination thereof. In addition, the deployment shown in FIG. 1 may include a content delivery network (CDN), not shown, connected between the client 110 and the protected entity 130. Example cloud computing platforms include Amazon® Web Services (AWS), Cisco® Metacloud, Microsoft® Azure®, Google® Cloud Platform, HP® Cloud, and the like.

The network 140 may be, but is not limited to, a local area network (LAN), a wide area network (WAN), the Internet, a cellular network, a metropolitan area network (MAN), a wireless network, an IoT network, or any combination thereof. A cellular network may include a long-term evolution (LTE) network, a 5G network, and the like.

According to the disclosed embodiments, a scanner detector 150 is deployed in-line of the protected entity 130. The scanner detector 150 may be deployed in a cloud computing platform, in an on-premises deployment, or both. The cloud computing platform may be, but is not limited to, a public cloud, a private cloud, or a hybrid cloud.

In an embodiment, when installed in the cloud computing platform, the scanner detector 150 may operate as a Software-as-a-Service (SaaS). In some configurations, the scanner detector 150 can also be deployed in a protection cloud platform as always-on protection. In some configurations, the scanner detector 150 is deployed at an edge network (not shown). An edge network may be communicatively connected between the client device and the protected entity 130. An edge network allows access to a plurality of computing resources, such as IoT devices, end-user devices, servers (virtual or physical) edge computing nodes, and virtual entities. The edge network may be a datacenter, an enterprise network, a private cloud, a public cloud, and the like.

Figure 2A:
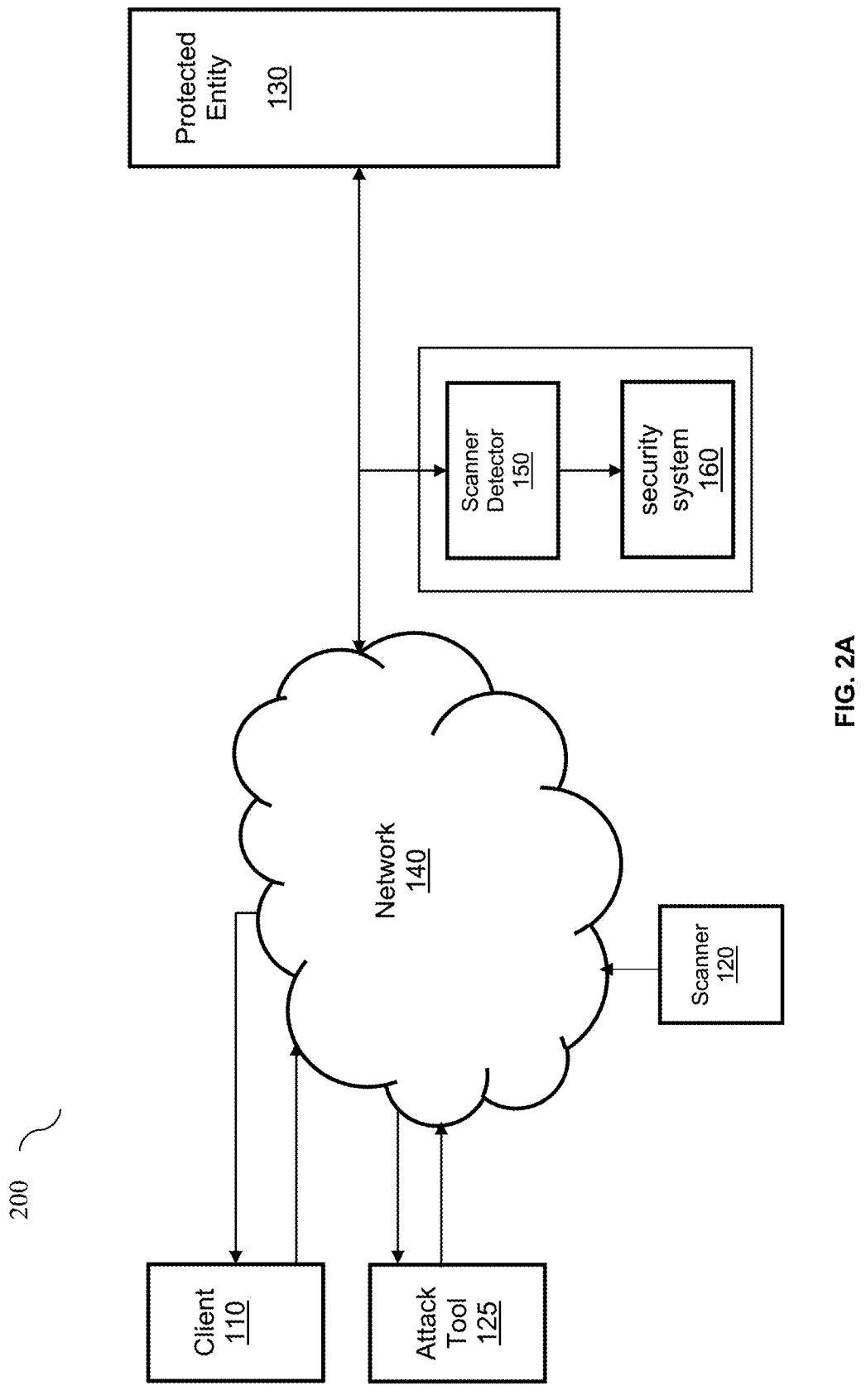
FIG. 2A is an illustration of an out-of-path deployment of the scanner detector according to an embodiment.

In an alternative implementation illustrated in FIG. 2A, the scanner detector 150 may be deployed out-of-path of traffic between the client device 110, the attack tool 125, and the protected entity 130.

Figure 2B:
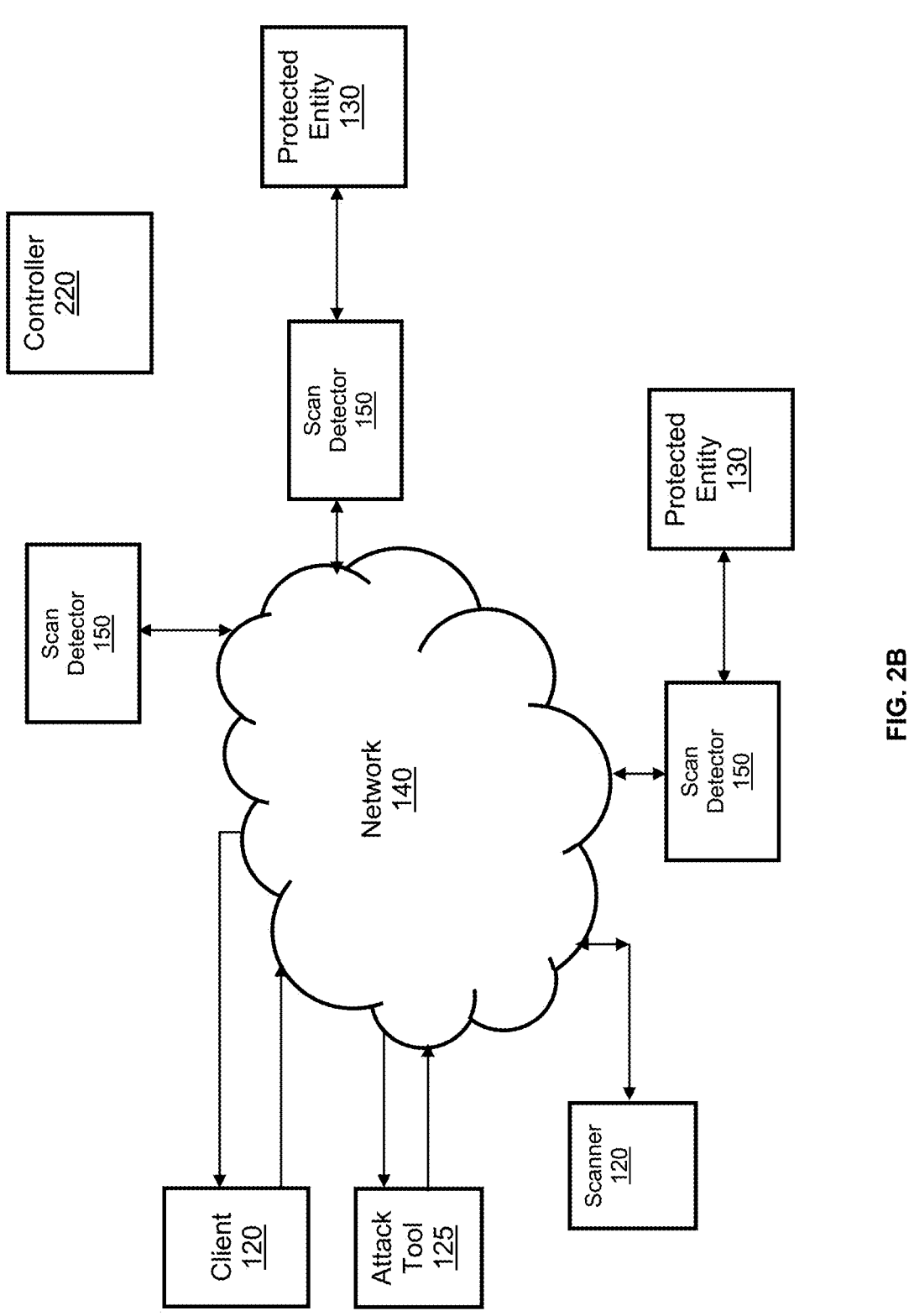
FIG. 2B is an illustration of a distributed deployment of the scanner detector according to an embodiment.

In another configuration, shown in FIG. 2B, the scanner detector 150 may be a distributed system connected in a number of locations to protect different protected entities 130 from different locations. In such a configuration, the scanner detector 150 may be controlled and/or orchestrated by a centralized controller 220.

Regardless of the deployment, the scanner detector 150 is a device, system, component, or the like, configured to provide for various functionalities including, without limitation, detection of cyber-attacks including DDoS attacks characterized by short bursts of any traffic volume, fast morphing DDoS attacks, and the like. The scanner detector 150 may be configured to execute one or more instructions, methods, and the like, including, without limitation, the processes described below. The scanner detector 150 can also be realized as software such as, but not limited to, a software application, service, micro-service, and the like. The software is executed over hardware, such as those discussed below with reference to FIG. 6. Hereinafter, the operation of scanner detector 150 will be discussed with reference to FIG. 1.

According to the disclosed embodiments, the scanner detector 150 may be configured to inspect traffic directed to the protected entity 130 to identify cyber-attack scanners (e.g., scanner 120). Specifically, the scanner detector 150 is configured to receive samples of traffic directed to the protected entity 130. Each sample may be a layer-4 (TCP/IP) packet. The scanner detector 150 may be configured to inspect each sample to at least extract a source IP address, a destination network address. The latter may include an IP address and a destination port number (if exists). The extracted source and destination IP addresses, destination port and, if necessary, other data, combined into tuples of <source, destination> values are stored in a buffer 151. Hereinafter, tuples are referred to as source-destination tuples or simply tuples. In an example embodiment, the buffer 151 is a circular buffer that may be realized as a data structure residing in a memory (not shown in FIG. 1) of the scanner detector 150.

The extracted source IP address is fed into a filter 152. In an embodiment, the filter 152 is an original modification of Bloom filter comprising an array of floating-point counters. In a conventional Bloom filter, a binary array is used to determine if a pattern has already been encountered. In the disclosed embodiments, the filter 152 is a structure with an array of floating-point counters. The values of such counters are estimates of the probability of hitting corresponding array elements. In a conventional Bloom filter, matching occurs when all hash indexes point to Boolean ones. According to the disclosed embodiments, the matching occurs when all hash indexes point to counters having values that exceed a preset or learned threshold.

The operation of the filter 152 is implemented as a Modified Bloom filter and now discussed with reference to FIG. 3. The filter 152 includes a mapper 310 and an array 320. The mapper 310 implements a set of k hash functions that map a network (IP) address to a vector of k indices point to the array 320. The array 320 includes M floating-point counters 321-1 through 320-M. The values of counters 321 express estimates of the probability of hitting the corresponding array's elements.

In an embodiment, with each new sample (IP source), all counters 321 are updated as follows: each counter at an element index ($321$-$i$) having an index that matches a hash value is incremented, while other counters element indexes ($321$-$j$, i≠j) are decreased in such a way that the sum of the probability estimates over the array persists equal to the number of hash functions (k).

The values of counters at element indexes ($320$-$i$) (their respective values have been incremented) are compared to a threshold (330). If values of all such counters are above the threshold, the source IP address (mapped to the hash values) is considered as suspicious. The threshold may be preconfigured or learned over time.

Figure 3:
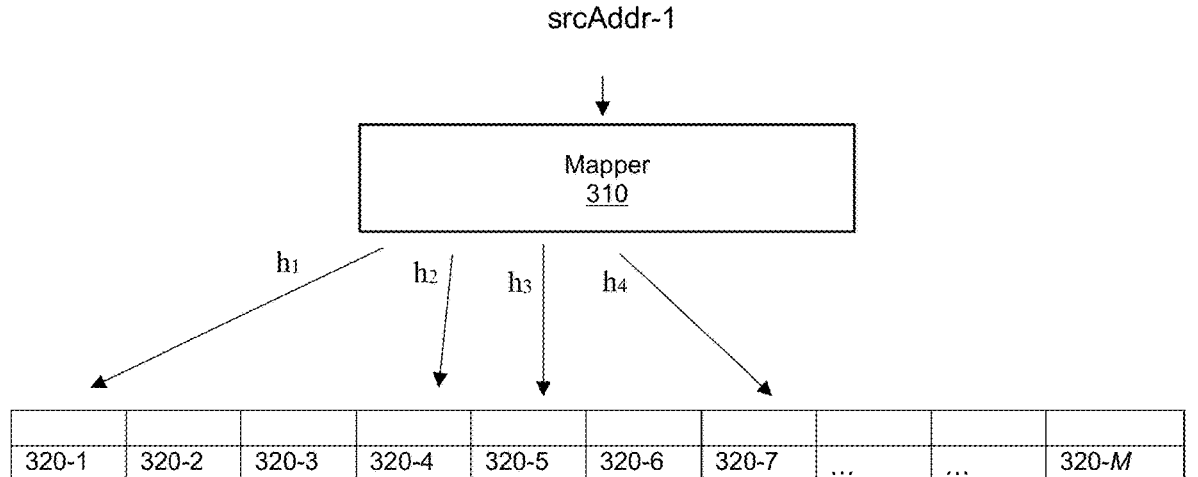
FIG. 3 is a schematic diagram illustrating the operation of a modified bloom filter according to an embodiment.

In the example demonstrated in FIG. 3, a source IP address (srcAddr-1) is matched to a hash vector 302 that includes 4 values ($h_1$, $h_2$, $h_3$, and $h_4$) that are mapped to indexes 320-1, 320-4, 320-5, and 320-7. All values of counters 320-1, 320-4, 320-5, and 320-7 are above the threshold. Therefore, the srcIP-1 is suspicious. In an embodiment, described below, the process of updating the counters is based on a random walk with a gradient attractor, described in more detail below.

Referring back to FIG. 1, when the filter 152 outputs a suspicious source IP address, a process for determining the diversity of the destination IP addresses and/or ports (collectivity referred to as "destination IP addresses") is performed based on source-destination tuples stored in the buffer 151. To this end, all destination IP addresses extracted from packets and related to the suspicious source IP are saved in the buffer 151. A diversification of destination IP addresses is determined based on a diversity score.

In an embodiment, a diversity score can be defined as a ratio of a number of unique destination network addresses in suspicious tuples to the total number of suspicious tuples. A suspicious tuple is defined as tuples containing the suspicious source IP address and temporarily stored in the buffer 151. If the diversity score is over a predefined (diversity) threshold, the suspicious IP address is reported as a cyber-attack scanner to be rejected.

In an embodiment, the scanner detector 150 triggers an alarm upon detection of cyber-attack scanner. The alarm may designate the suspicious IP address and all destination IP addresses scanned by the detected scanner.

In certain deployments, the scanner detector 150 may be connected with, integrated with, or communicate with a security system 160 configured to detect and mitigate DDoS attacks. In such deployments, the scanner detector 150 can send the alarms to the security system 160 to allow quick detection and mitigation of the attack tool. In an embodiment, the security system 160 may be configured to block the detected scanner 120.

In the example shown in FIG. 1, the client device 110 sends legitimate traffic to the protected entity 130. The frequency that a legitimate client device 110 sends requests to a destination IP address is significantly lower than the scanner detector 150 defines as a suspicious, and the number of destination IP addresses that each client device 110 accesses is significantly lower than what the client device would access.

Figure 4:
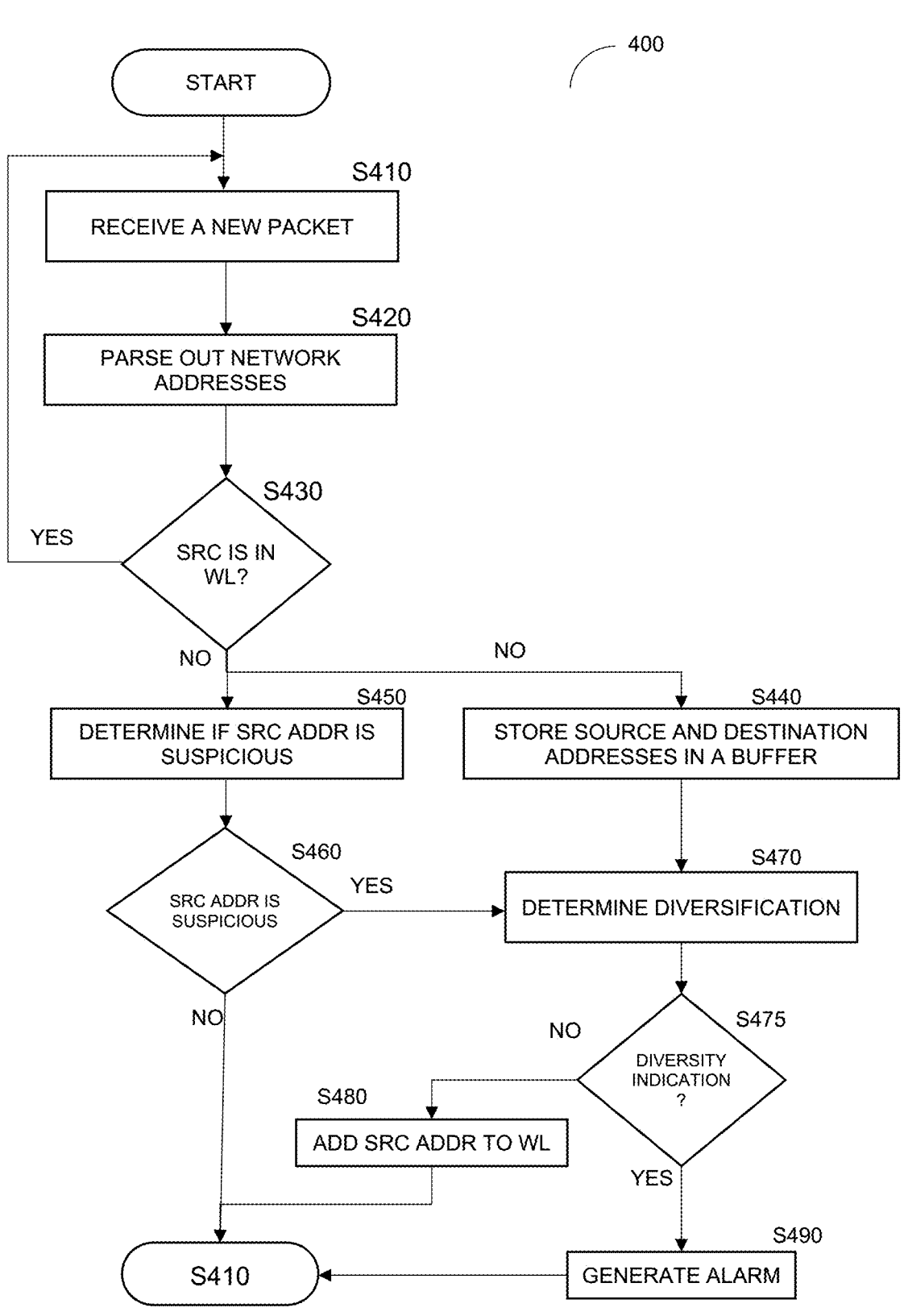
FIG. 4 is a flowchart illustrating a method for detecting cyber-attack scanners according to an embodiment.

FIG. 4 shows an example flowchart 400 illustrating a method for detecting cyber-attack scanners according to an embodiment.

At S410, a new packet is received. The packet may be a TCP/IP packet sent from a legitimate client, an attack tool, or a cyber-attack scanner. At S420, the network addresses in the received packets are parsed out (or extracted). The network addresses may include a source IP address, a destination IP address, a destination port, and the like.

At S430, the whitelist is checked to determine if the source IP address is designated. In an embodiment, the whitelist may be preconfigured. In yet another embodiment, the whitelist is initially set to be empty or with a list of known addresses, and then filled up with addresses that are determined to be legitimate (i.e., not of a network scanner). Filling the whitelist with such addresses is discussed below.

If the source network address is not in the list, the source address is stored in a buffer (S440) in conjunction with a destination network (IP and/or port) address.

At S450, a process to determine if the source network address designated in the incoming packet is suspicious. In an embodiment, the process is performed by operation of a Modified Bloom filter by estimating the likelihood that the source IP address has already been received, and the rate (frequency) that the same address has already been received. The operation of S450 is discussed with reference to FIG. 5.

At S460, based on the output of S450, the source network address is checked to determine if it is suspicious. If so, execution continues with S470; otherwise, execution returns to S410 where another packet is inspected. It should be noted that the method can be executed as long as the cyber-attack scanner detection is required.

At S470, the diversification of destination network addresses is determined. The operation of S470 is discussed with reference to FIG. 6. At S475, a process to check if the destination network addresses accessed by the same source network address are determined to be diverse or not. That is, if the same source scans multiple different source network addresses. If so, at S490, an alarm is triggered; otherwise, at S480, the source network address is added to the whitelist and execution returns to S410 where another packet is inspected. As noted above, the alarm may designate the suspicious IP address and all destination IP addresses scanned by the detected scanner. Further, the alarm may be sent to a DDoS detection or mitigation device.

Figure 5:
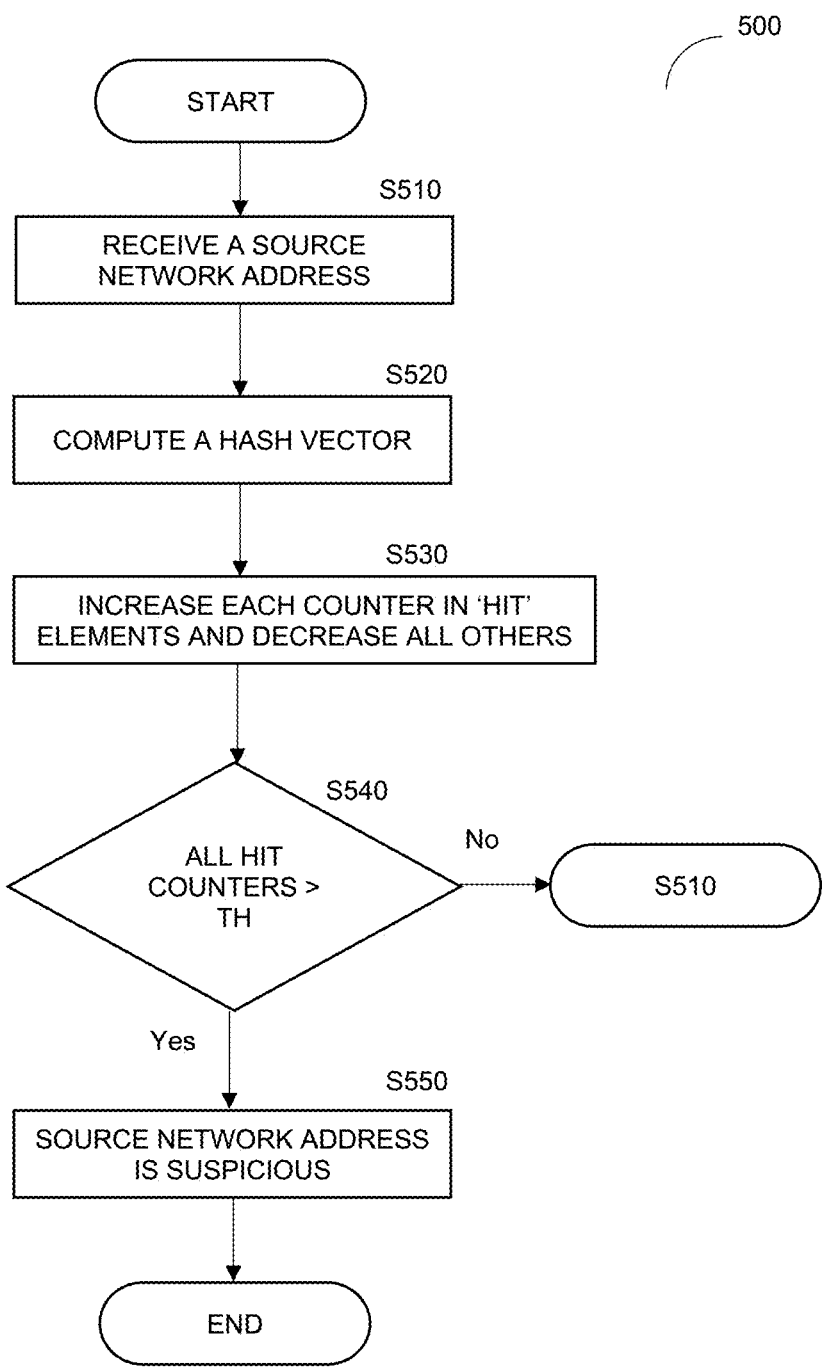
FIG. 5 is a flowchart illustrating the process for determining if a source network address is suspicious according to an embodiment.

FIG. 5 is an example flowchart S450 illustrating the process for determining if a source network address is suspicious according to an embodiment. The process is performed by the Modified Bloom filter designing to estimate the probability of hitting the elements of flowing point array by the hash mapping of an income pattern (e.g., source network address) in its floating-point counters.

At S510, a source network address is received. This is the same source network address provided as S450, i.e., the address extracted from the input packet.

At S520, a vector of hash values is computed by applying a set of hash functions on the source network address. The vector of hash values maps the network address to certain indexes in the array of the filter. Example for such mapping is provided above. A set of hash functions used for the mapping may include, for example, a Fowler-Noll-Vo hash functions, a MurmurHash functions, or any other type of non-cryptographic hash functions that provides uniformly distributed output for uniformly distributed random input.

At S530, a counter in each index pointed by the vector of hash values is incremented and all other counters are decremented by a certain real value. In an embodiment, the process of updating the counters is based on a "random walk with a gradient attractor" and is being performed so that the counter's values represent the probability of hitting the corresponding elements, or to some extent the likelihood of coincidence with a previously encountered source network address.

Specifically, the further the value $v_i$ i=$\{0, 1, 2, \ldots, M-1\}$ is from the mean, the larger (in absolute value) the expected increment value $\mathbb{E}[\Delta v_i]$, which is always directed towards the mean value being computed as follows:

$$\mathbb{E}[\Delta v_i] = \lambda(p - v_i),\ i=0,1,2, \ldots, M-1,$$

where, $v_i$ is a value of a counter at an index 'i', p=k/M is the mean value of the counters in a normal steady state (i.e., the probability of an element to be hit), $\lambda$ is a preconfigured updating factor (where $\lambda \ll p$). The number of elements in the array is M.

The increment value $\Delta v_{h_n}$ of a specific counter that a hash value $h_n$ points is computed as follows:

$$\Delta v_{h_n} = \lambda(1 - v_{h_n}),\ n=0,1,2, \ldots, k-1$$

where, $\{h_0, h_1, h_2, \ldots, h_{k-1}\}$=H is a set of k hash indexes. The decrement value for "non-hit" element is determined as follows:

$$\Delta v_{j'} = -\lambda v_{j'},$$

where j' is an index of the non-hit elements (there are M–k non-hit elements).

Figure 7:
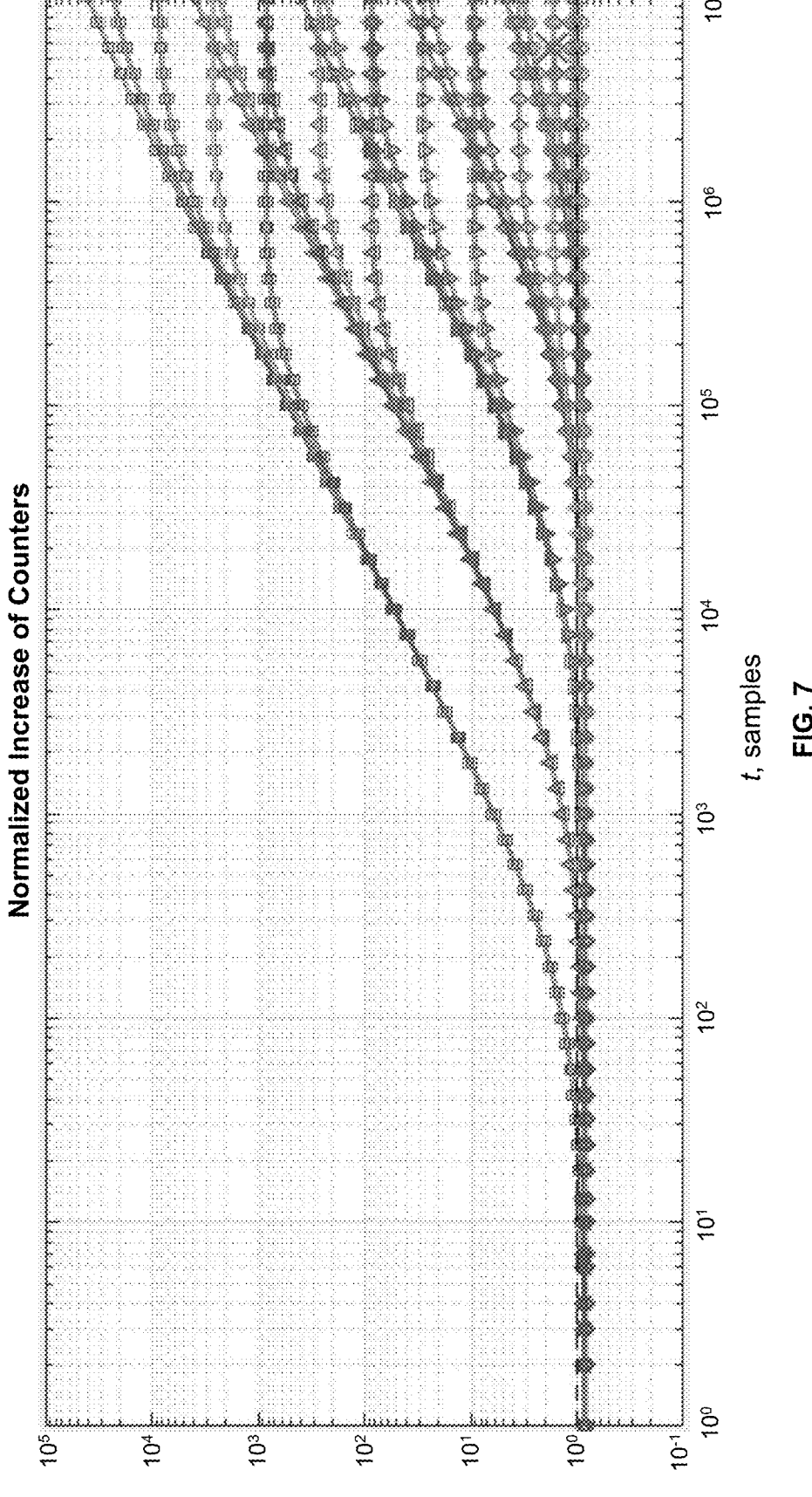
FIG. 7 is an example draft showing the increase in the counter's values, over time, during a scan by a cyber-attack scanner.

In a steady state, all counter's values $v_i$ are about the mean value p. When at a specific time $t_0$, a suspicious source network address appears, having contribution is $\gamma$ ($p < \gamma \ll 1$), then the corresponding counters increase asymptotically to a new mean value:

$$\breve{p} = p(1 - \gamma) + \gamma$$

$$\mathbb{E}[v_{h_n}] = \breve{p} + (p - \breve{p})e^{-\lambda(t - t_0)}$$

where, t is the implied sequential number of incoming samples, not the actual time. The increase in the counter's values, over time, during a scan by a cyber-attack scanner is shown in FIG. 7. The steady state is when no definite disturbing patterns are encountered.

At S540, the values of all counters incremented at S530 are compared to a threshold. If all hit counter's values exceed the threshold, at S550, the received source network address is determined as suspicious and indication on the same is returned. Otherwise, execution returns to S510 waiting for a reception of a new network source address to evaluate.

In an embodiment, a desired sensitivity of the detection of a source network address as suspicious can be configured by the setting various parameters of the filter 152. For example, if k=$2^4$, M=$2^{19}$, $\lambda$=k/16M, the threshold equal to 1.5 p will be exceeded by an attacker with an intensity of only 0.01% relative to normal traffic (e.g., 10 Mbps of scanner from total traffic 100 Gbps) on average, after only about 165000 of all samples, which means only about 1.5 milliseconds.

As noted for each source network address determined as suspicious, destination network addresses accessed by the source address are further evaluated to determine their diversity (or variety).

Figure 6:
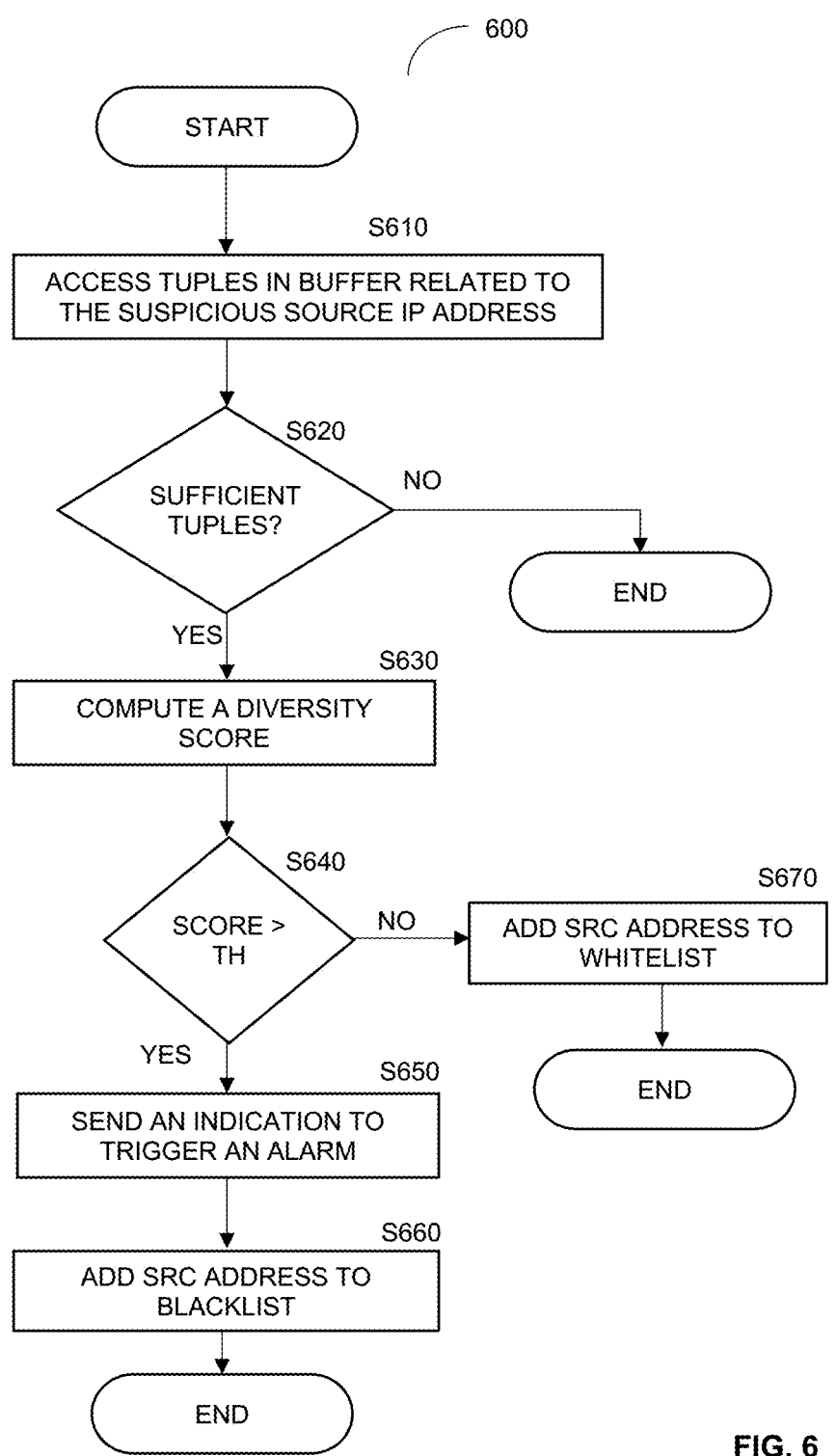
FIG. 6 is a flowchart illustrating the process for determining the diversification of destination network addresses according to an embodiment.

FIG. 6 is an example flowchart of a process S470 for determining the diversification of destination network addresses according to an embodiment.

At S610, a buffer temporary storing the source-destination tuples of all incoming samples is accessed. In an embodiment, the buffer is a circular buffer, but any other data structure may be utilized to temporarily store such addresses.

At S620, the buffer is checked to determine that the number of suspicious tuples is sufficient for analysis. That is, if there were too few samples from the suspicious source IP address, then the diversification cannot be fulfilled. To this, a predefined number of the samples related to the suspicious source IP address should be buffered. If S620 results with a No answer, execution ends. The number of the tuples required for the check may be preconfigured based on, for example, the required sensitivity, or response time. If the number of corresponding tuples of source and destination network addresses sufficient, execution continues with S630.

At S630, a diversity score is computed. In an embodiment, the diversity score can be defined as a ratio of a number of unique destination network addresses to the total number of tuples pertaining to the suspicious source IP address temporary kept in the buffer 151. At S640, the diversity threshold is checked to determine if the score is over a predefined value. In an embodiment, the diversity threshold is set to a positive value that is smaller than 1 and be configured to meet a certain sensitivity. If the score exceeds the threshold, at S650, an indication that an alarm can be triggered is sent. In an embodiment, the suspicious source IP address may be added to the blacklist S660 for perpetual rejection. Otherwise, at S670, the source IP address that was determined as suspicious is added to the whitelist for future bypassing the scan check; then execution ends.

Figure 8:
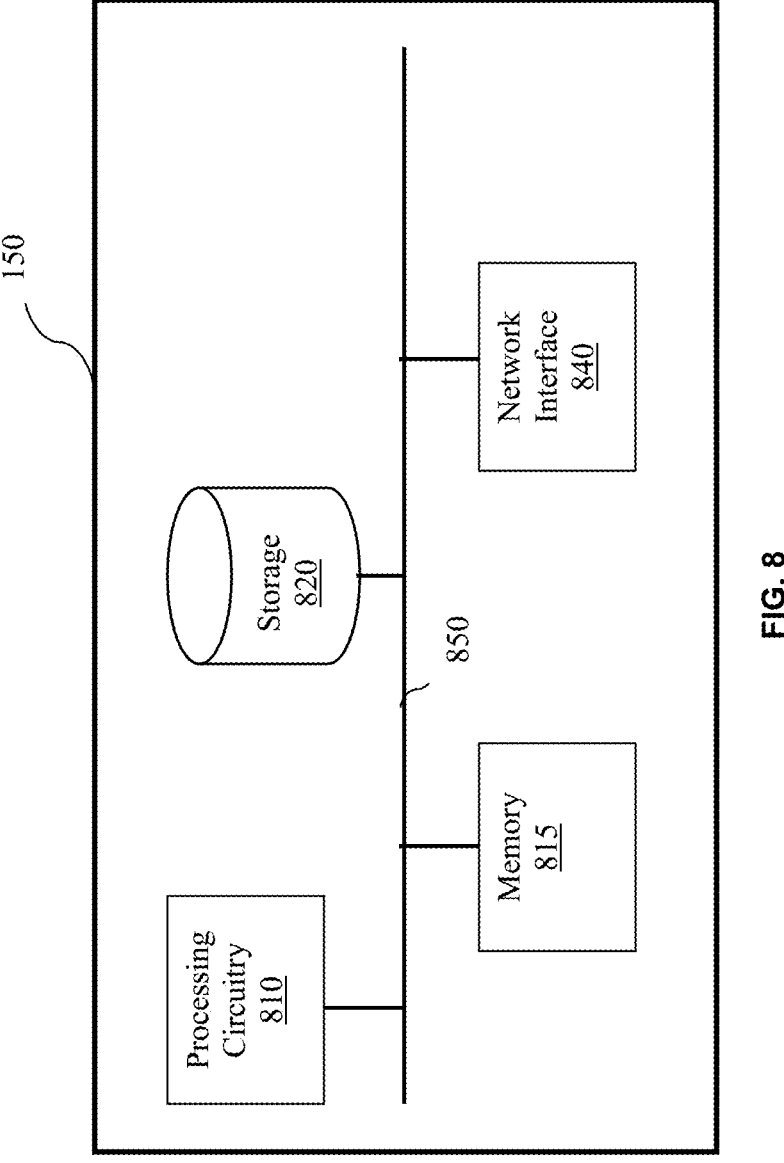
FIG. 8 is a block diagram of the scanner detector implemented according to an embodiment.

FIG. 8 is an example block diagram of the scanner detector 150 implemented according to an embodiment. The scanner detector 150 includes a processing circuitry 810 coupled to a memory 815, a storage 820, and a network interface 840. In another embodiment, the components of the scanner detector 150 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 815 may be volatile (e.g., RAM, etc.), non-volatile (e.g., ROM, flash memory, etc.), or a combination thereof. In one configuration, computer readable instructions to implement one or more embodiments disclosed herein may be stored in the storage 820.

In another embodiment, the memory 815 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various processes described herein. Specifically, the instructions, when executed, cause the processing circuitry 810 to perform the embodiments described herein.

The storage 820 may be magnetic storage, optical storage, and the like, and may be realized, for example, as flash memory or other memory technology, CD-ROM, Digital Versatile Disks (DVDs), or any other medium which can be used to store the desired information. The storage 820 may include workflow schemes as described herein.

The processing circuitry 810 is configured to detect and cause mitigation of HTTPS flood attacks, and any encrypted DDoS attacks, as described herein. The network interface 840 allows the scanner detector 150 to communicate at least with the servers and clients. The embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for detecting a cyber-attack scanner, comprising:

determining if a source network address designated in a received packet is suspicious of being a cyber-attack scanner, wherein the determination is based on a likelihood that the source network address was previously frequently encountered, the likelihood being assessed using a Probabilistic Modified Bloom filter and wherein determining if the source network address is suspicious further comprises:

mapping the source network address to a vector of hash values, wherein each hash value in the vector of hash values points to a location in an array of counters of the Probabilistic Modified Bloom filter; and incrementing, by an increment value, a counter value of each counter in the array pointed by a respective hash value, wherein the increment value is based on a current counter value and a preconfigured updating factor;

upon determining that the source network address is suspicious, determining diversity of destination network addresses sent by a source having the network address; and upon determining that the destination network addresses are diversified, generating an alarm indicating that a source network address is a cyber-attack scanner, wherein a cyber-attack scanner is a device to identify destination network addresses in a protected entity that can be exploited for at least a cyber-attack.

2. The method of claim 1, further comprising:

prior to determining if the source network address is suspicious, checking if the source network address is included in a whitelist source network addresses; and performing the method for source network addresses not included in the whitelist.

3. The method of claim 1, further comprising:

prior to determining if the source network address is suspicious, checking if the source network address is included in a blacklist of source network addresses; and rejecting the source network address included in the blacklist.

4. The method of claim 1, further comprising:

comparing counter values of all counters being incremented to a threshold; and issuing an indication that the source network address is suspicious when all counter values being incremented exceeding the threshold.

5. The method of claim 1, further comprising:

decrementing, by a decrement value, a counter value of each counter in the array not pointed by a respective hash value, wherein the decrement value is based on a current counter value and a preconfigured updating factor.

6. The method of claim 1, wherein each counter in the array is a floating-point counter.

7. The method of claim 4, wherein the counter value is a current probability estimate to hit the counter.

8. The method of claim 1, wherein determining diversity of destination network addresses further comprising:

temporary buffering tuples of source and destination network addresses;

computing a diversity score as a ratio of a number of unique destination addresses to a total of buffered tuples pertaining to the suspicious source network address; and comparing the diversity score to a diversity threshold, wherein the destination network addresses are determined diversified when the diversity score exceeds a diversity threshold.

9. The method of claim 8, further comprising:

buffering tuples of source network addresses and destination network addresses in a circular buffer.

10. The method of claim 1, wherein generating the alarm indicating further comprises:

blocking the scanner based on the suspicious source network address; and reporting the suspicious source network address to a mitigation tool.

11. The method of claim 1, wherein the cyber-attack is at least a distributed denial of service (DDOS) attack.

12. A non-transitory computer readable medium having stored thereon instructions for a process for detecting a cyber-attack scanner, the process comprising:

determining if a source network address designated in a received packet is suspicious of being a cyber-attack scanner, wherein the determination is based on a likelihood that the source network address was previously frequently encountered, the likelihood being assessed using a Probabilistic Modified Bloom filter and wherein determining if the source network address is suspicious further comprises:

mapping the source network address to a vector of hash values, wherein each hash value in the vector of hash values points to a location in an array of counters of the Probabilistic Modified Bloom filter; and incrementing, by an increment value, a counter value of each counter in the array pointed by a respective hash value, wherein the increment value is based on a current counter value and a preconfigured updating factor;

upon determining that the source network address is suspicious, determining diversity of destination network addresses sent by a source having the network address; and upon determining that the destination network addresses are diversified, generating an alarm indicating that a source network address is a cyber-attack scanner, wherein a cyber-attack scanner is a device to identify destination network addresses in a protected entity that can be exploited for at least a cyber-attack.

13. A system for detecting a cyber-attack scanner, comprising:

a processing circuitry; and a memory, the memory containing instructions that, when executed by the processing circuitry, configure the system to:

determine if a source network address designated in a received packet is suspicious of being a cyber-attack scanner, wherein the determination is based on a likelihood that the source network address was previously frequently encountered, the likelihood being assessed using a Probabilistic Modified Bloom filter;

upon determining that the source network address is suspicious, determine diversity of destination network addresses sent by a source having the network address; and upon determination that the destination network addresses are diversified, generate an alarm indicating that a source network address is a cyber-attack scanner, wherein a cyber-attack scanner is a device to identify destination network addresses in a protected entity that can be exploited for at least a cyber-attack;

wherein the system is further configured to:

map the source network address to a vector of hash values, wherein each hash value in the vector of hash values point to a location in an array of counters of the Probabilistic Modified Bloom filter; and increment, by an increment value, a counter value of each counter in the array pointed by a respective hash value, wherein the increment value is based on a current counter value and a preconfigured updating factor.

14. The system of claim 13, wherein the system is further configured to:

prior to determining if the source network address is suspicious, check if the source network address is included in a whitelist source network addresses; and perform the operations for which the system is configured per claim 13 for source network addresses not included in the whitelist.

15. The system of claim 13, wherein the system is further configured to:

prior to determining if the source network address is suspicious, check if the source network address is included in a blacklist of source network addresses; and reject the source network address included in the blacklist.

16. The system of claim 13, wherein the system is further configured to:

compare counter values of all counters being incremented to a threshold; and issue an indication that the source network address is suspicious when all counter values being incremented exceeding the threshold.

17. The system of claim 13, wherein the system is further configured to:

decrement, by a decrement value, a counter value of each counter in the array not pointed by a respective hash value, wherein the decrement value is based on a current counter value and a preconfigured updating factor.

18. The system of claim 17, wherein each counter in the array is a floating-point counter, and the array of counters is included in a Probabilistic Modified Bloom filter.

19. The system of claim 18, wherein the counter value is a current probability estimate to hit the counter.

20. The system of claim 14, wherein the system is further configured to:

temporarily buffer tuples of source and destination network addresses;

compute a diversity score as a ratio of a number of unique destination addresses to a total of buffered destination addresses pertaining to the suspicious source network address; and compare the diversity score to a diversity threshold, wherein the destination network addresses are determined diversified when the diversity score exceeds a diversity threshold.

21. The system of claim 20, wherein the system is further configured to:

buffer tuples of source network addresses and destination network addresses in a circular buffer.

22. The system of claim 13, wherein the system is further configured to:

block the scanner based on the suspicious source network address; and report the suspicious source network address to a mitigation tool.

23. The system of claim 13, wherein the cyber-attack is at least a distributed denial of service (DDOS) attack.

\* \* \* \* \*